Patented Nov. 26, 1935

2,022,050

UNITED STATES PATENT OFFICE 2,022,050

PREPARATION OF PHOSPHORIC ACIDS

Charles Lewis Levermore, Rockville Centre, N. Y., assignor to General Chemical Company, New York, N. Y., a corporation of New York No Drawing. Application November 30, 1932, Serial No. 645,133

6 Claims. (Cl. 23—165)

This invention relates to the manufacture and purification of phosphoric acids and has for an object an improved method for the decomposition of ammonium phosphates to obtain phosphoric acids.

It has been proposed to purify crude phosphoric acids by treating them with ammonia or ammonium salt solutions in order to precipitate impurities. The impurities are then separated from the ammonium phosphate solution, as by decantation and filtration, and the solution is then evaporated to dryness and heated to decompose the ammonium phosphate.

In accordance with the present invention I have found that the decomposition of ammonium phosphates is greatly facilitated if carried out in the presence of considerable quantities of water vapor. For instance, if after water has been driven off from ammonium phosphates, instead of merely heating the molten phosphate to a high temperature, heating is accompanied by agitation with steam, much greater speed of reaction results.

Steam may be introduced into contact with the ammonium phosphate being decomposed in any suitable manner. The steam may merely be introduced below the surface of the liquid and bubbled up therethrough. The heat necessary may be supplied by the steam, in some cases, or an externally heated still may be employed, or steam may be used for heating the liquid by indirect heat exchange while additional steam is passed therethrough. The contacting of the steam with the ammonium phosphate may be effected by spraying the phosphate into the steam rather than by bubbling the steam through the phosphate, if desired.

The temperature at which the process is carried out may be varied, but the decomposition of the ammonium phosphate is more rapid at higher temperatures. However, for a given temperature a considerably greater amount of ammonia will be driven off in a definite period of time where steam is employed than would be driven off in the same period of time where no steam is used.

The effect of the steam on the rapidity of the reaction is more pronounced at lower temperatures. For example, in one case mono-ammonium phosphate was heated to a temperature of 300° C., no steam being introduced into the material and in another case the phosphate was heated under the same conditions except that the phosphate was agitated with steam. It was found that five times as much ammonia was driven off in the latter case.

At higher temperatures the advantage of employing steam is still evident although not to as great a degree as at the lower temperatures. For instance, at a temperature of 425° C. heating of mono-ammonium phosphate without steam resulted in driving off 65% of the ammonia present whereas by agitation with steam at the same temperature 78% of the ammonia was driven off in a corresponding period. If the decomposition of an ammonium ortho-phosphate is carried out at lower temperatures,—say below 250 to 300° C.,—the ortho-phosphoric acid or the pyrophosphoric acid may be obtained directly. At higher temperatures the meta-phosphoric acid will be produced.

During the heating small quantities of phosphorus pentoxide may be driven off with the ammonia. The evolution of the phosphorus pentoxide appears to be accelerated by increase in temperature. It will be obvious to those skilled in the art that the ammonia as well as the phosphorus pentoxide driven off can be recovered as desired. For instance, these may be absorbed in crude phosphoric acid for the preparation of more ammonium phosphate which may then be decomposed in the above manner.

The heating of the meta-phosphoric acid may be continued until all of the ammonia has been evolved. The residual meta-phosphoric acid may be converted by known methods, such as by hydrolysis in hot phosphoric acid solution, to orthophosphoric acid of such purity that pure salts may be prepared from it.

I claim:

1. The method of driving off ammonia from an ammonium phosphate at a temperature above about 300° C., which comprises heating the phosphate and passing steam into contact therewith.

2. The method of decomposing an ammonium phosphate which comprises maintaining the ammonium phosphate in a liquid condition, heating the liquid phosphate and simultaneously bubbling steam up therethrough.

3. The method of decomposing mono-ammonium phosphate which comprises melting the phosphate and then heating the melted phosphate and simultaneously bubbling steam up therethrough.

4. The method of preparing meta-phosphoric acid from an ammonium phosphate which comprises contacting the ammonium phosphate with water vapor at a temperature above about 300° C.

5. The method of preparing meta-phosphoric acid from mono-ammonium ortho-phosphate, which comprises contacting the phosphate at a temperature above about 300° C. with a current of steam and drawing off volatile reaction products in said current of steam.

6. The method of preparing ortho-phosphoric acid from an ammonium ortho-phosphate, which comprises contacting the phosphate at a temperature above about 300° C. with a current of steam thereby driving off ammonia and forming meta-phosphoric acid, and then hydrolyzing the meta-phosphoric acid to form ortho-phosphoric acid.

CHARLES LEWIS LEVERMORE.